(12) United States Patent
Makaran et al.

(10) Patent No.: US 6,801,009 B2
(45) Date of Patent: Oct. 5, 2004

(54) CURRENT LIMITATION PROCESS OF BRUSH AND BRUSHLESS DC MOTORS DURING SEVERE VOLTAGE CHANGES

(75) Inventors: John Edward Makaran, London (CA); Ke Liu, London (CA)

(73) Assignee: Siemens VDO Automotive Inc., Mississauga (CA)

( * ) Notice: Subject to any disclaimer, the term of this patent is extended or adjusted under 35 U.S.C. 154(b) by 101 days.

(21) Appl. No.: 10/305,607

(22) Filed: Nov. 27, 2002

(65) Prior Publication Data

US 2004/0100216 A1 May 27, 2004

(51) Int. Cl.[7] .............................. H02H 7/08; H02H 7/09
(52) U.S. Cl. ....................... 318/599; 318/811; 318/138; 318/439; 361/7; 361/23; 361/90; 388/903
(58) Field of Search ................................ 318/801, 138, 318/254, 439, 434, 701, 721–724, 811, 599; 388/903, 804, 811, 819; 361/78, 7, 23, 30, 90, 92, 93.9; 340/648

(56) References Cited

U.S. PATENT DOCUMENTS

| | | | | |
|---|---|---|---|---|
| 4,873,453 A | * | 10/1989 | Schmerda et al. | 318/434 |
| 4,975,628 A | * | 12/1990 | Lemieux | 318/599 |
| 5,274,317 A | * | 12/1993 | Utley et al. | 318/802 |
| 5,343,382 A | * | 8/1994 | Hale et al. | 318/599 |
| 5,583,404 A | * | 12/1996 | Karwath et al. | 318/254 |
| 5,666,463 A | * | 9/1997 | Schwartz et al. | 318/811 |
| 6,307,336 B1 | * | 10/2001 | Goff et al. | 318/254 |
| 6,307,337 B1 | * | 10/2001 | Nelson | 318/254 |
| 6,329,785 B1 | * | 12/2001 | Starkie et al. | 318/811 |
| 6,400,544 B1 | * | 6/2002 | Grimm et al. | 361/94 |
| 6,469,461 B1 | * | 10/2002 | Konda et al. | 318/254 |
| 6,525,506 B2 | * | 2/2003 | Jin | 318/801 |
| 6,611,117 B1 | * | 8/2003 | Hardt | 318/254 |

FOREIGN PATENT DOCUMENTS

JP 03065092 A * 3/1991 ............. H02P/6/02

* cited by examiner

Primary Examiner—David Martin
Assistant Examiner—Eduardo Colon Santana

(57) ABSTRACT

A closed-loop control system for a DC motor includes a DC motor 12, a current sensor 14 for determining a current of the motor, a voltage sensor 32 for measuring a voltage of the motor 12, and a micro-controller 33. The micro-controller is constructed and arranged to (1) compare the determined current with a set point and output a pulse width modulated (PWM) duty cycle to control the motor, and (2) calculate a PWM duty cycle limit based on the measured voltage and compare the outputted PWM duty cycle to the PWM duty cycle limit such that when the outputted PWM duty cycle greater than the PWM duty cycle limit, the outputted PWM duty cycle is set to the PWM duty cycle limit. A method, in a DC motor, of preventing a current surge during severe voltage changes is also disclosed.

16 Claims, 2 Drawing Sheets

US 6,801,009 B2

CURRENT LIMITATION PROCESS OF BRUSH AND BRUSHLESS DC MOTORS DURING SEVERE VOLTAGE CHANGES

FIELD OF THE INVENTION

The invention relates to DC motors and, more particularly, to a process of limiting current surge of brush or brushless DC motors during severe voltage changes.

BACKGROUND OF THE INVENTION

Brush and brushless DC motors have been used frequently in battery-supplied applications, such as automotive, electrical vehicle, forklift, etc. The battery voltage can change drastically when a large load is engaged, such as a starter motor, etc. A severe voltage change can cause a current surge in the motor since the current control loop is usually not fast enough to respond to the voltage change. As a result, the motor or power electronics may fail. FIG. 1 shows a typical current surge caused by a severe voltage change in a DC motor.

The motor current is controlled at a reference value before a voltage dip occurs. When the voltage dips, the current dips as well. Then, the current control loop starts increasing the PWM duty cycle to compensate for the current decrease. When the voltage starts rising, the current control loop is not fast enough to reduce the PWM duty cycle accordingly. Therefore, a current surge occurs due to the high voltage and high duty cycle. Improving the response time of the current control loop can help suppress current surges, but this improvement is limited since the current loop's response time also depends on the sensing circuitry, motor parameters and the capability of a micro-controller.

Accordingly, there is a need to provide a voltage-based current limitation process that can respond to voltage changes quickly.

SUMMARY OF THE INVENTION

An object of the invention is to fulfill the need referred to above. In accordance with the principles of the present invention, this objective is achieved by method, in a DC motor, of preventing a current surge during severe voltage changes. The method measures a voltage of the motor, compares the measured voltage to a set under-voltage limit and if the measured voltage is below the under voltage limit, stops the motor for a certain amount of time and then re-starts the motor. The method also calculates a pulse width modulated (PWM) duty cycle limit based on the measured voltage. An output PWM duty cycle, for controlling the motor, is compared to the PWM duty cycle limit and if the output PWM duty cycle is greater than the PWM duty cycle limit, the output PWM duty cycle is set to be the same as the PWM duty cycle limit.

In accordance with another aspect of the invention, a closed-loop control system for a DC motor is provided. The system includes a DC motor, a current sensor for determining a current of the motor, a voltage sensor for measuring a voltage of the motor, and a micro-controller. The micro-controller is constructed and arranged to (1) compare the determined current with a set point and output a pulse width modulated (PWM) duty cycle to control the motor, and (2) calculate a PWM duty cycle limit based on the measured voltage and compare the outputted PWM duty cycle to the PWM duty cycle limit such that when the outputted PWM duty cycle greater than the PWM duty cycle limit, the outputted PWM duty cycle is set to the PWM duty cycle limit. The micro-controller is also constructed and arranged to compare the measured voltage with an under-voltage limit and if the measured voltage is below the under-voltage limit, to stop the motor for a certain amount of time and then to re-start the motor.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
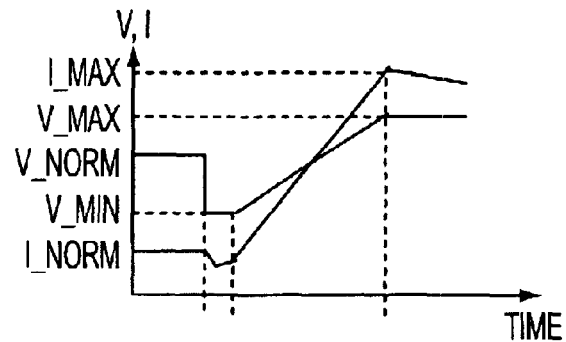
FIG. 1 shows a typical current surge in a DC motor caused by a severe voltage change.
Figure 2:
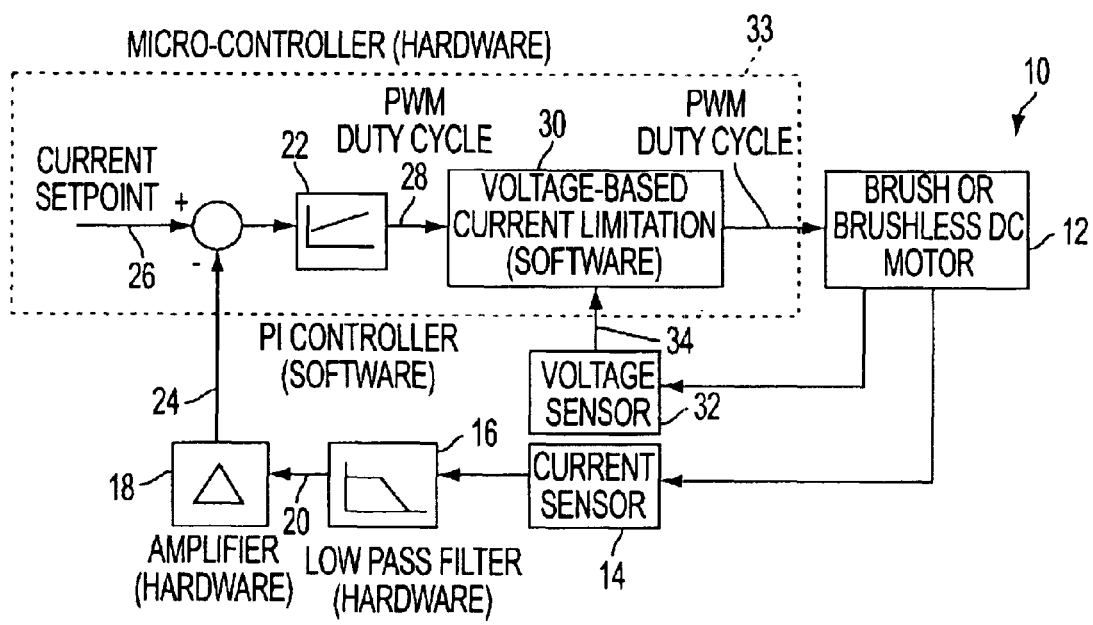
FIG. 2 is a block diagram of current loop control system of a brush or brushless DC motor with a voltage-based current limitation process, in accordance with the principles of the present invention.

With reference to FIG. 2, a current control loop system of a brush or brushless DC motor is shown, generally indicated at 10, in accordance with the invention. The system 10 includes a DC motor 12 with a power inverter. The motor 12 can be a brush or brushless, three-phase or five-phase, etc., motor. A current sensor 14, such as, for example, a shunt or a Hall effect sensor, senses current of the motor 12. A low pass filter 16 filters high frequency noise, such as switching noise. An amplifier 18 enhances the measured current signal 20 to fit the accuracy of an A/D converter (not shown). A PI controller 22 compares the current feedback 24 with a current set point 26 and outputs a PWM duty cycle 28 to control the motor 12.

In accordance with the invention, the system 10 includes a voltage-based current limiter 30, and a voltage sensor 32 for sensing motor voltage. The PI controller 22 and the voltage based current limiter 30 are both implemented in software that is executed by a micro-controller 33.

The purpose of the current limitation process is to prevent a current surge during severe voltage changes by limiting the PWM duty cycle or stopping the motor operation. The limitation process of the invention includes two actions: (1) an under-voltage protection, (2) a voltage-based PWM duty cycle limit.

With regard to the under-voltage function, the measured voltage 34 is compared with a pre-set under-voltage limit via the limiter 30 software. When the measured voltage 34 drops below this limit, the limiter 30 software signals the microcontroller 33 to stop the operation of the motor 12 and to re-start the motor 12 after a couple of seconds. This under-voltage protection prevents the current control loop from producing an unnecessarily high duty cycle.

With regard to voltage-based PWM duty cycle limit, based on the measured voltage 34, a PWM duty cycle limit is calculated (via limiter 30 software) as:

$$DCL = DCL_{max} - c \cdot V_{bat}$$

where, DCL is the calculated duty cycle limit, $DCL_{max}$ is a constant, which represents the maximum value of DCL, c is a factor, which can be set at different values for different operational conditions, such as start-up, normal operation, etc., and $V_{bat}$ is the battery voltage.

Figure 3:
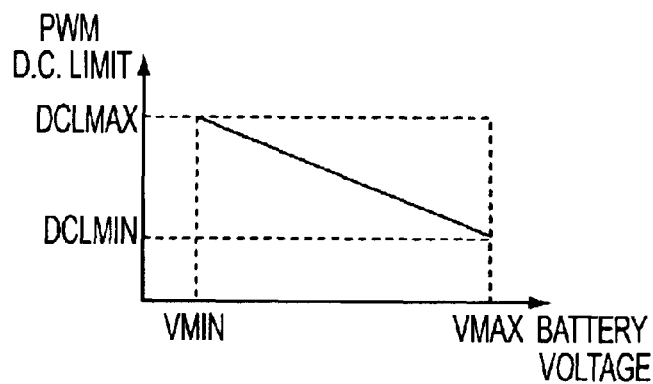
FIG. 3 shows the relationship between a calculated duty cycle limit and battery voltage.

FIG. 3 shows the relationship between the calculated duty cycle limit and the battery voltage. The calculated duty cycle limit DCL will change instantaneously along with the voltage change. When the output duty cycle 28 (FIG. 2) is greater than the duty cycle limit DCL, the output duty cycle 28 is set to be the same as the duty cycle limit DCL. Therefore, the motor current can be limited under a certain level. As a result, excessive current will be prevented, even during severe voltage drops, such as, when a vehicle's starter motor is operated.

Figure 4:
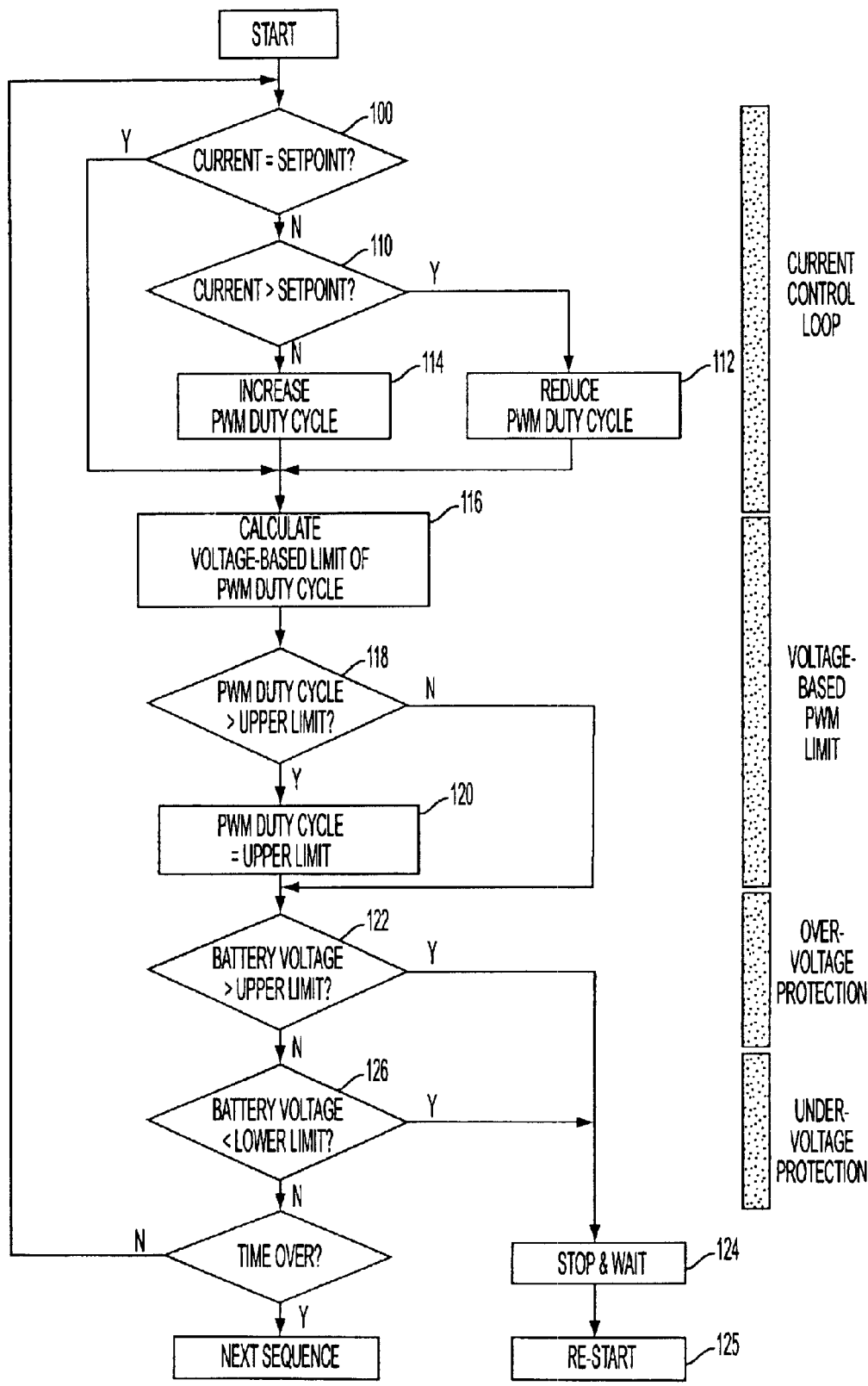
FIG. 4 is flowchart indicating the voltage-based current limitation process of the invention.

As noted above, the voltage-based current limitation process is implemented in software (limiter 30) and executed by the micro-controller 33. A flowchart of this part of software is illustrated in FIG. 4, showing a current control loop, a voltage-based PWM limit routine, an over-voltage protection routine and an under-voltage protection routine. In the current control loop, in steps 100 and 110, the current 24 is compared to the current set point 26 (see FIG. 2). If the current 24 is greater than the set point 26, the PWM duty cycle 28 is reduced in step 112. If the current 24 is less than the set point 26, the PWM duty cycle is increased in step 114. If the current 24 is equal to the set point 26 or after steps 112 and 114, the process proceeds to step 116 where the voltage-based limit of the PWM duty cycle is calculated. Step 116 begins the voltage-based PWM limit routine. In step 118, it is determined if the PWM duty cycle 28 is greater than the PWM duty cycle limit. If so, then the PWM duty cycle is set to equal the PWM duty cycle limit in step 120 and if not, the process proceeds to an over-voltage protection routine that begins at step 122.

In step 122, the battery voltage is compared to an upper limit. If the battery voltage is greater than the upper limit, the motor 12 is stopped and a waiting period is established in step 124. After the waiting period, the motor 12 is re-started in step 125. If the battery voltage is not greater than the upper limit, then in step 126, the battery voltage is compared to a lower limit in the under-voltage protection routine. If the battery voltage is less than the lower limit, then the process proceeds to steps 124 and 125. If the battery voltage is not less than the lower limit, then the process returns to step 100 (current control loop) or to the next sequence.

Thus, in accordance with the embodiment, two actions are applied in the proposed current limitation process: (1) an under-voltage protection function is implemented; (2) a voltage-based PWM duty cycle limit is added. The first action will stop the motor operation when the voltage drops below a lower limit, and will re-start the motor a couple of seconds. This under-voltage protection prevents the current control loop from producing an unnecessarily high duty cycle. The second action in the current limitation process sets a PWM duty cycle limit based on the input voltage. This limit will change instantaneously along with the voltage changes, and will replace the output of the current control loop if the output duty cycle is greater than the limit. Therefore the motor current can be limited under a certain level, and a large current surge can be prevented.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method, in a DC motor, of preventing a current surge during severe voltage changes, the method including:

measuring a voltage of the motor, comparing the measured voltage to a set under-voltage limit and if the measured voltage is below the under voltage limit, stopping the motor for a certain amount of time and then re-starting the motor, calculating a pulse width modulated (PWM) duty cycle limit based on the measured voltage, and comparing an output PWM duty cycle, for controlling the motor, to the PWM duty cycle limit and if the output PWM duty cycle is greater than the PWM duty cycle limit, setting the output PWM duty cycle to be the same as the PWM duty cycle limit.

2. The method of claim 1, wherein the motor is a brush DC motor.

3. The method of claim 1, wherein the motor is a brushless DC motor.

4. The method of claim 1, wherein the duty cycle limit is calculated as:

$$DCL = DCL_{max} - c * V_{bat}$$

where DCL is the calculated duty cycle limit, $DCL_{max}$ is a constant, representing a maximum value of DCL, c is a factor set for an operating condition of the motor, and $V_{bat}$ is a voltage of a battery powering the motor.

5. The method of claim 4, wherein the factor c is set based on a start-up condition of the motor.

6. The method of claim 4, wherein the factor c is set based on a normal operating condition of the motor.

7. A closed-loop control system for a DC motor comprising:

a DC motor, a current sensor for determining a current of the motor, a voltage sensor for measuring a voltage of the motor, a micro-controller constructed and arranged to (1) compare the determined current with a set point and output a pulse width modulated (PWM) duty cycle to control the motor, and (2) calculate a PWM duty cycle limit based on the measured voltage and compare the outputted PWM duty cycle to the PWM duty cycle limit such that when the outputted PWM duty cycle greater than the PWM duty cycle limit, the outputted PWM duty cycle is set to the PWM duty cycle limit.

8. The system of claim 7, wherein the motor is a brush DC motor.

9. The system of claim 7, wherein the motor is a brushless DC motor.

10. The system of claim 7, further comprising a low pass filter for filtering high frequency noise and an amplifier to enhance the determined current.

11. The system of claim 7, wherein the micro-controller is constructed and arranged to compare the measured voltage with an under-voltage limit and if the measured voltage is below the under-voltage limit, to stop the motor for a certain amount of time and then to re-start the motor.

12. A closed-loop control system for a DC motor comprising:

a DC motor, means for determining a current of the motor, means for comparing the determined current with a set point and outputting a pulse width modulated (PWM) duty cycle to control the motor, means for measuring a voltage of the motor, and limiting means for calculating a PWM duty cycle limit based on the measured voltage and for comparing the outputted PWM duty cycle to the PWM duty cycle limit such that when the outputted PWM duty cycle greater than the PWM duty cycle limit, the outputted PWM duty cycle is set to the PWM duty cycle limit.

13. The system of claim 12, wherein the motor is a brush DC motor.

14. The system of claim 12, wherein the motor is a brushless DC motor.

15. The system of claim 12, further comprising means for filtering high frequency noise, and an amplifier to enhance the determined current.

16. The system of claim 12, wherein the limiting means also compares the measured voltage with an under-voltage limit and if the measured voltage is below the under-voltage limit, the limiting means signals to stop the motor for a certain amount of time and then to re-start the motor.

* * * * *